June 18, 1935.         L. N. MILLER                2,005,000
                    DIFFERENTIAL MOTOR
                Filed July 18, 1931      2 Sheets-Sheet 2
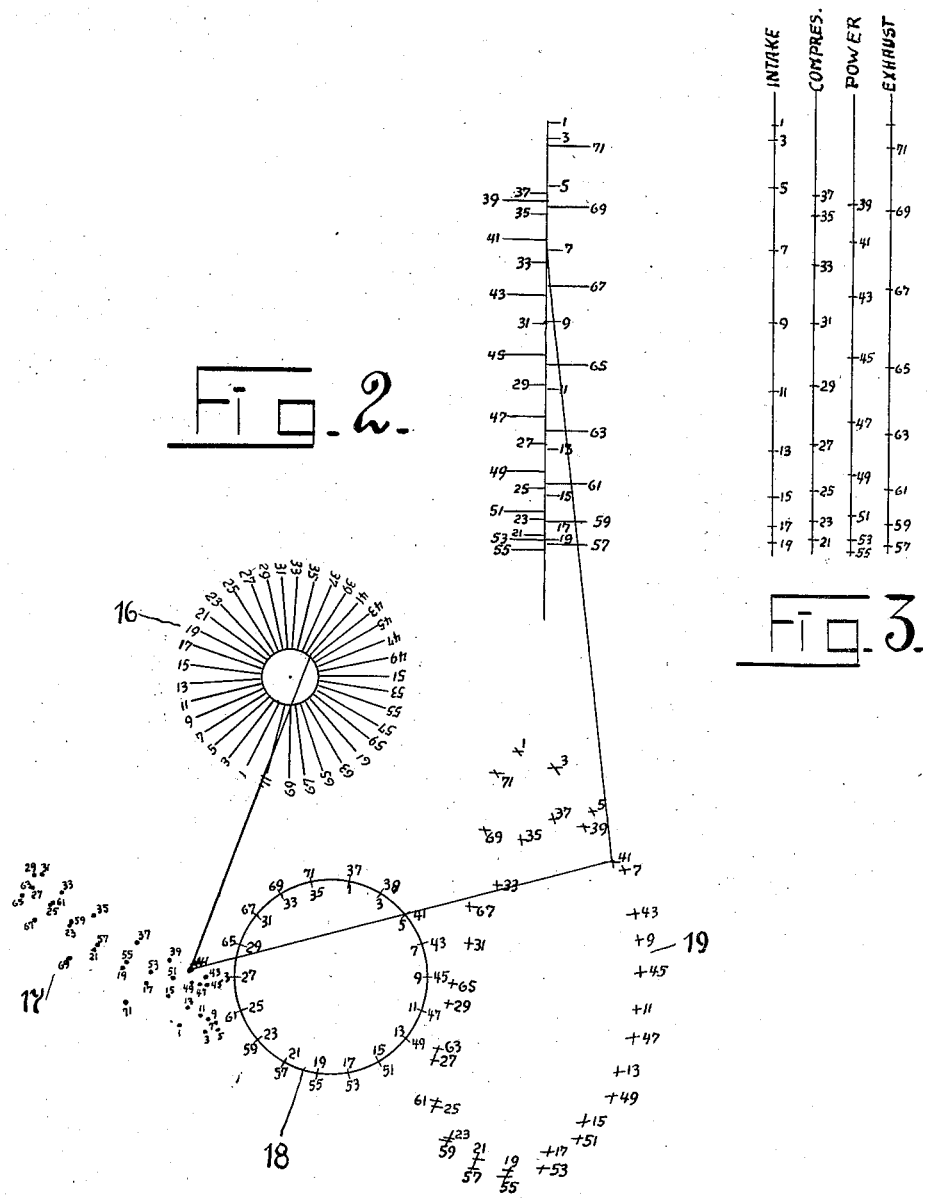
INVENTOR
L. N. Miller
BY
H. W. Baker
ATTORNEY Patented June 18, 1935

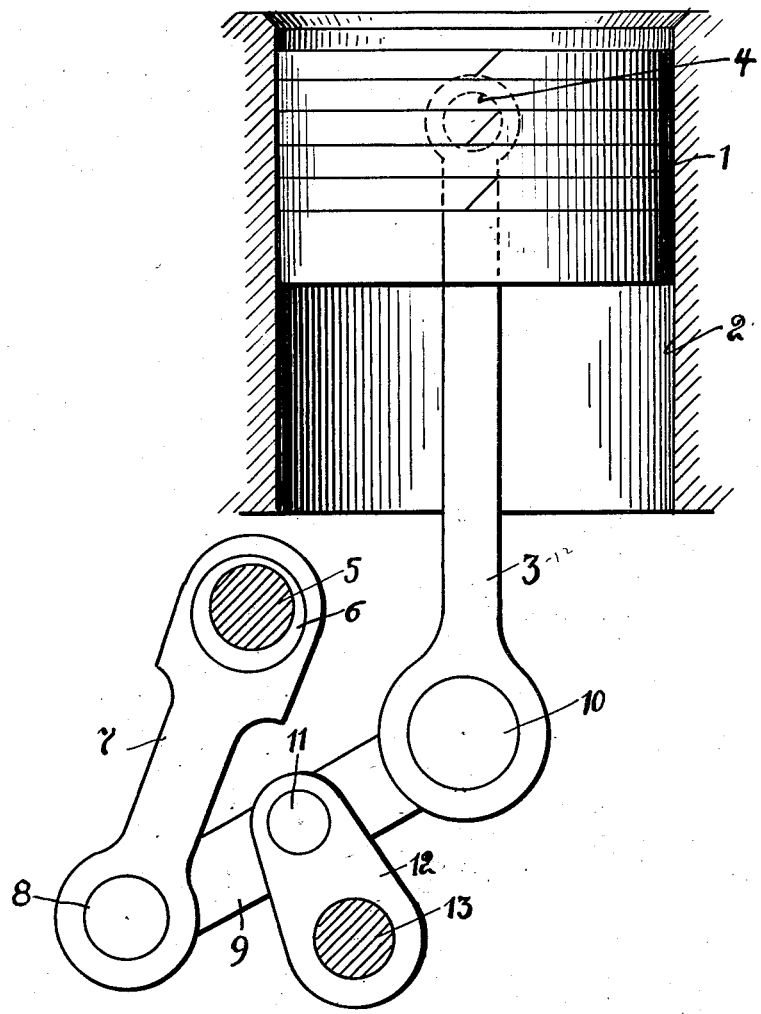

2,005,000

UNITED STATES PATENT OFFICE 2,005,000

DIFFERENTIAL MOTOR

Lauritz N. Miller, Eugene, Oreg., assignor to L. N. Miller Engineering Corporation, a corporation of Delaware Application July 18, 1931, Serial No. 551,715

6 Claims. (Cl. 74—40)

This invention relates to an improved internal combustion engine in which there will be a long piston travel and short crank throw, compact in form, so constructed that there will be a minimum tendency to vibrate by localizing strains and loads and one in which the stroke of the piston is varied so that the intake and exhaust strokes will be greater than the compression and power strokes. The power of repulsion from the piston is transmitted by means of a conventional type of connecting rod to one end of a beam, the other end of which is suspended by means of a pendulum link on the cam shaft. This beam is clamped at the center to the crank pin and in this manner imparts motion to the crank shaft. Other objects and advantages of the construction will appear in the detailed specification and claims which follow.

In the drawings:

Figure 1 is a side elevational view, partly in cross section, of the mechanism.

Figure 2 is a diagrammatic view showing the relative positions of the parts throughout four cycles of the piston, and, Figure 3 is a diagrammatic view showing the position of the piston throughout four cycles thereof.

The piston 1 reciprocates in the cylinder 2 and is connected to a pitman 3 by means of a wrist pin 4. Integral with the cam shaft is an eccentric 6 on which is mounted a pendulum link 7 which carries a pin 8 to which is pivoted a beam 9 which carries a pin 10 received by the lower portion of the pitman 3. A pin 11 connects approximately the mid-portion of the beam 9 to a crank 12 secured to a crank shaft 13.

As is well known in the art, the cam shaft 5 makes one-half as many revolutions as the crank shaft 13. In Figure 2, the upper group of figures represent the respective positions of the piston, 1 denoting its position at the beginning of the intake stroke, 3 representing its position after the crank shaft has rotated 30 degrees, and each of the succeeding numerals representing the position of the piston after the crank shaft has turned an additional 20 degrees. In order to make this clearer I have, in Figure 3, shown four lines representing the various positions of the piston when the crank shaft has turned 10 degrees, 30 degrees, 50 degrees, and so on throughout 720 degrees, or two complete rotations of the crank shaft, which would mean four strokes of the piston.

The group of figures 16 (Figure 2) shows the various positions of the center of the eccentric 6 throughout a complete rotation of the said eccentric, which would correspond to two revolutions of the crank shaft. I have placed the same numerals on this group of figures, as well as all other groups of figures, so as to show the position of the various parts when the crank shaft has rotated 10 degrees, 30 degrees and 50 degrees and so on throughout 720 degrees of the rotation of the crank shaft. The group of figures 17 indicates the various positions of the center of the pin 8 throughout the two revolutions of the said crank shaft. The group of figures 18 shows the position of the center of the crank pin 11 and the group of figures 19 shows the positions which will be reached by the center of the pin 10 throughout the two revolutions of the crank shaft.

The advantage of a long exhaust stroke is that it more nearly exhausts the spent gases from the cylinder than is the case in the conventional engine. This is followed by a long intake stroke which has the advantage of filling the cylinder with a pure combustible mixture not contaminated by the presence of as large a portion of spent gases as is the case with a constant stroke engine. The compression and the power strokes are approximately equal in length and are shorter than the intake and exhaust strokes.

By means of this construction I am, therefore, enabled to secure a more satisfactory scavenging or exhaust stroke than would otherwise be the case and I am enabled to have a long intake stroke while securing this advantage.

Referring to Figure 1, it will be noted that if an explosion took place in the cylinder with the parts in the position shown, there would be a downward thrust on the pitman 3 and an upward thrust, and to the right, on the link 7. If, for instance, the pin 8 were rigidly secured to one of the side walls of the engine, this would tend to create a whipping action, which is almost completely eliminated by suspending the link 7 from the cam shaft and inclining its upper end inwardly in the direction of the piston.

If desired the eccentric 6 may be made concentric with the cam shaft 5 so that its only function will be to support the link 7. In this case, the center of the pin 8 would simply describe an arc of a circle instead of the movement indicated by the numeral 17 in Figure 2, which would, of course, affect the piston movement. In other words, the degree of eccentricity of the eccentric 6 might be made any amount desired and might even be zero.

I realize that many changes may be made in the specific form of the invention as shown in this application and I, therefore, desire to claim the same broadly except as I may limit myself in the annexed claims.

Having now described my invention, I claim:

1. In combination, a piston, a member, a pitman connected to said piston and to one end of said member, an eccentric, a link supported by said eccentric, means operatively connecting said link to said member, a driven crank, and a crank pin directly connecting said member and crank.

2. In combination, a piston, a member, an eccentric, means operatively connecting said piston to one end of said member, a link operatively connecting said eccentric to the other end of said member, a crank shaft, a crank thereon, and means carried by said member and crank and operatively connecting the same.

3. In combination, a piston, a pitman operatively connected to said piston, a cam shaft, an eccentric mounted thereon, a pendulum link supported and driven by said eccentric, a beam, means operatively connecting one end of said beam to said pitman, means operatively connecting the other end of said beam to said link, a crank shaft, and a crank directly connecting said beam to said crank shaft.

4. In combination, a piston, a pitman operatively connected thereto, a cam shaft, an eccentric mounted thereon, a link supported and driven by said eccentric, a beam operatively connected to said pitman and link, a rotatable member, a crank pin directly connected to said beam and rotatable member so that the amount of reciprocation which said piston will have will be, in part, controlled by said eccentric.

5. In combination, a piston, a cam shaft, means interposed between said piston and cam shaft whereby the power stroke and exhaust stroke of said piston will be varied, said means including a link pivoted to said cam shaft, a link pivoted to said piston, a beam operatively connecting said links, and a rotatable pivot for said beam.

6. In combination, a reciprocating means, a rotary eccentric, a member operatively connected to said reciprocating means, a pendulum mounted on said eccentric and connected to said member, a crank shaft, a crank carried thereby, and means connecting said member to said crank.

LAURITZ N. MILLER.